(12) United States Patent
Li (10) Patent No.: US 6,453,068 B1
(45) Date of Patent: Sep. 17, 2002

(54) LUMINANCE ENHANCEMENT WITH OVERSHOOT REDUCTION CONTROL BASED ON CHROMINANCE INFORMATION

(75) Inventor: Xing Li, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/398,623

(22) Filed: Sep. 17, 1999

(51) Int. Cl.$^7$ ................................................ G06K 9/00
(52) U.S. Cl. ...................... 382/167; 382/205; 382/254; 382/260; 382/275; 382/266; 358/518; 358/520; 358/530; 358/1.9
(58) Field of Search ............................... 382/162, 274, 382/167, 260, 261, 205, 254, 275, 266; 358/518, 520, 532, 530, 1.9, 531, 504, 3.27; 348/607

(56) References Cited

U.S. PATENT DOCUMENTS 4,631,579 A  * 12/1986  Hoffrichter et al. ......... 358/515
5,666,443 A     9/1997  Kumashiro
5,959,683 A  *  9/1999  Harrigton .................... 348/511

* cited by examiner

*Primary Examiner*—Phuoc Tran
*Assistant Examiner*—Ali Bayat
(74) *Attorney, Agent, or Firm*—Fay, Sharpe, Fagan, Minnich & McKee, LLP (57) ABSTRACT

A method and apparatus for digital image processing are provided for controlling luminance channel overshoot in response to FIR or other enhancement processing based upon chrominance. The luminance value of the enhanced digital image data for each pixel of an image is compared to corresponding local minimum and maximum luminance values of the non-enhanced image obtained from the neighborhood of the subject pixel. If an enhanced luminance value for a subject pixel falls outside the corresponding local minimum/local maximum luminance value range by a positive or negative overshoot amount, the enhanced luminance value is adjusted to attenuate the overshoot amount. The amount by which the enhanced luminance value for an enhanced pixel is adjusted varies depending upon the chrominance of the enhanced pixel. Also, the amount of overshoot attenuation can vary depending upon whether the enhanced luminance value is greater than the local maximum luminance value or less than the local minimum luminance value.

19 Claims, 7 Drawing Sheets

LUMINANCE ENHANCEMENT WITH OVERSHOOT REDUCTION CONTROL BASED ON CHROMINANCE INFORMATION

BACKGROUND OF THE INVENTION

The present invention relates to the digital image processing arts. In particular, it relates to enhancement of digital image data, and a method and apparatus for attenuating overshoot in the luminance channel based upon the chrominance channel when edge enhancement operations are performed. Thus, the present invention provides a method and apparatus for reducing color shift and ringing due to edge enhancement operations without compromising resulting edge sharpness.

A main advantage of digital image reproduction relative to traditional light-lens image reproduction resides in the ability to process the digital image data so as to enhance the appearance of the final output image. For example, digital filtering is often performed to sharpen edges and fine lines for purposes of making an output image more visually appealing. When reducing or scaling-down an image, pre-filtering is often performed prior to sub-sampling for purposes of anti-aliasing. Due to limitations of the filtering algorithm, this filtering operation can blur an image. Also, in color image reproduction, it is a common practice to sub-sample the chrominance information to reduce the number of bits necessary to represent an image. This, too, can result in blurred edges. In either case and others, edge enhancement of the filtered image can be performed to sharpen the final output image.

One drawback associated with conventional edge enhancement operations is that the luminance information can be altered significantly from its original value so that the color of the final output image is shifted compared to the original image. Another undesirable effect of enhancement operations is the formation of dark or light rings about colored image regions. Color fringing and ringing are, obviously, undesirable and must be controlled in order to provide an aesthetically pleasing final image. On the other hand, luminance channel overshoot is less important to the appearance of the final output image if it occurs in areas of the image that are less colorful or "neutral," e.g., in regions of black-and-white text data. Heretofore, no effective method and apparatus have been provided for controlling luminance channel overshoot due to image enhancement operations without compromising edge sharpness. Furthermore, no effective method and apparatus for controlling luminance channel overshoot have been provided wherein the overshoot attenuation is varied depending upon the chrominance of the image data.

SUMMARY OF THE INVENTION

In accordance with the present invention, a new and improved method and apparatus are provided for luminance channel overshoot control in image enhancement operations.

In accordance with a first aspect of the present invention, a method of digital image processing comprises receiving input digital image data defining a plurality of pixels of an input color digital image, wherein the input digital image data includes at least a luminance value and a chrominance value for each of the pixels of the input image. For each of the pixels of the input digital image, the input digital image data defining the pixel is enhanced based upon the input digital image data defining neighborhood pixels in a spatial neighborhood established about the pixel to obtain enhanced digital image data defining the pixel, the enhanced digital image data including at least an enhanced luminance value. For each of the pixels of the input digital image, an overshoot control operation is performed on the enhanced digital image data defining the pixel, wherein the overshoot control operation comprises: (i) determining local maximum and local minimum input luminance values in a spatial neighborhood about the pixel; (ii) comparing the enhanced luminance value of the pixel to the local maximum and local minimum luminance values to determine if the enhanced pixel luminance value is: (a) above the local maximum luminance value by a positive overshoot amount; or, (b) below the local minimum luminance value by a negative overshoot amount; (iii) receiving an input overshoot reduction coefficient; (iv) evaluating the chrominance of the pixel; (v) using the chrominance of the pixel to adjust the input overshoot reduction coefficient so as to obtain a modified overshoot reduction coefficient; (vi) if the enhanced luminance value of the pixel is above the local maximum luminance value, reducing the enhanced luminance value to attenuate the positive overshoot amount by a quantity that depends upon the modified overshoot reduction coefficient; and, (vii) if the enhanced luminance value of the pixel is below the local minimum luminance value, increasing the enhanced luminance value to attenuate the negative overshoot amount by a quantity that depends upon the modified overshoot reduction coefficient.

In accordance with another aspect of the present invention, a method of enhancing a color digital image comprises, for each of a plurality of pixels defining the color digital image, modifying a luminance value of a subject pixel in response to an enhancement filtering operation to obtain a modified luminance value for the subject pixel. Within a neighborhood of pixels spatially near the subject pixel, identifying a local minimum pixel luminance value and a local maximum pixel luminance value. The chroma of the subject pixel is determined and an overshoot reduction coefficient is received. The overshoot reduction coefficient is modified based upon the chroma of the subject pixel to obtain a modified overshoot reduction coefficient, and the modified luminance value is compared to at least one of the local minimum and local maximum luminance values. If the modified luminance value is greater than the local maximum luminance value, the modified overshoot reduction coefficient is used to reduce the modified luminance value of the subject pixel by a percentage of the amount by which the modified luminance value exceeds the local maximum luminance value. If the modified luminance value is less than the local minimum luminance value, the modified overshot reduction coefficient is used to increase the modified luminance value of the subject pixel by a percentage of the amount by which the modified luminance value is less than the local minimum luminance value.

In accordance with still another aspect of the present invention, a digital image processing apparatus comprises means for receiving input digital image data defining a plurality of pixels of an input color digital image, the input digital image data including at least a luminance value and a chrominance value for each of the pixels of the input image. A means adapted for enhancing each of the pixels of the input digital image based upon the input digital image data defining neighborhood pixels in a spatial neighborhood established about each of the pixels to obtain enhanced digital image data defining each of the enhanced pixels is provided, the enhanced digital image data including at least an enhanced luminance value. A means is also provided for performing an overshoot control operation on the enhanced digital image data defining each enhanced pixel, wherein the means for performing an overshoot control operation includes: (i) means for determining local maximum and local minimum input luminance values in a spatial neighborhood about each enhanced pixel; (ii) means for comparing the enhanced luminance value of each enhanced pixel to the local maximum and local minimum luminance values to determine if the enhanced pixel luminance value is: (a) above the local maximum luminance value by a positive overshoot amount; or, (b) below the local minimum luminance value by a negative overshoot amount; (iii) means for receiving an input overshoot reduction coefficient; (iv) means for evaluating the chrominance of the enhanced pixel as defined by the chrominance value; (v) means for using the chrominance of the enhanced pixel to adjust the input overshoot reduction coefficient so as to obtain a modified overshoot reduction coefficient; (vi) means for reducing the enhanced luminance value to attenuate the positive overshoot amount by a quantity that depends upon the modified overshoot reduction coefficient if the enhanced luminance value of the pixel is above the local maximum luminance value; and, (vii) means for increasing the enhanced luminance value to attenuate the negative overshoot amount by a quantity that depends upon the modified overshoot reduction coefficient if the enhanced luminance value of the pixel is below the local minimum luminance value.

In accordance with yet another aspect of the present invention, a method of processing a digital image includes enhancing a luminance value (L*) of each of a plurality of input pixels (P) to obtain an enhanced luminance value (FIR_OUTPUT) for each pixel. A positive overshoot is associated with a subject pixel of said digital image is identified if the enhanced luminance value (FIR_OUTPUT) of the subject pixel is greater than a local maximum luminance value (LOCAL_MAX) of input pixels (P) in a spatial neighborhood of the subject pixel in the digital image by a positive overshoot amount (OS). A negative overshoot associated with a subject pixel of the digital image is identified if the enhanced luminance value (FIR_OUTPUT) of the subject pixel is less than a local minimum luminance value (LOCAL_MIN) of input pixels (P) in a spatial neighborhood of the subject pixel in the digital image by a negative overshoot amount (OS'). An overshoot reduction coefficient (f) is provided for controlling the amount by which positive or negative overshoot associated with the subject pixel is attenuated. The overshoot reduction coefficient (f) is adjusted according to a chrominance of the subject pixel so that the overshoot reduction coefficient (f) is adjusted to have increasing overshoot attenuation effect as the chrominance of the subject pixel increases. The overshoot reduction coefficient (f), as adjusted based upon the chrominance of the subject pixel, is used to attenuate either the positive or negative overshoot associated with the subject pixel.

One advantage of the present invention is the provision of a method and apparatus for luminance channel overshoot control during digital image processing enhancement operations.

Another advantage of the present invention resides in the provision of a method and apparatus for controlling luminance channel overshoot resulting from edge enhancement processing wherein color shift and ringing are reduced or minimized without compromising edge sharpness.

A further advantage of the present invention is found in the provision of a method and apparatus for reducing luminance channel overshoot using original min/max luminance values from pixels in the neighborhood surrounding a pixel being processed and based upon the chrominance channel values for the pixel being processed.

A yet further advantage of the present invention resides in the provision of a method and apparatus for attenuating luminance channel overshoot in edge enhancement operations, wherein the attenuation varies depending upon whether the overshoot is positive or negative.

Still other benefits and advantages of the present invention will become apparent to those of ordinary skill of the art to which the invention pertains upon reading and understanding the present specification.

BRIEF DESCRIPTION OF THE DRAWINGS

The present invention may take form in various components and arrangements of components, and in various steps and arrangements of steps, preferred embodiments of which are disclosed herein and illustrated in the accompanying drawings which form a part hereof and wherein.

DETAILED DESCRIPTION OF THE PREFERRED EMBODIMENTS

Figure 1:
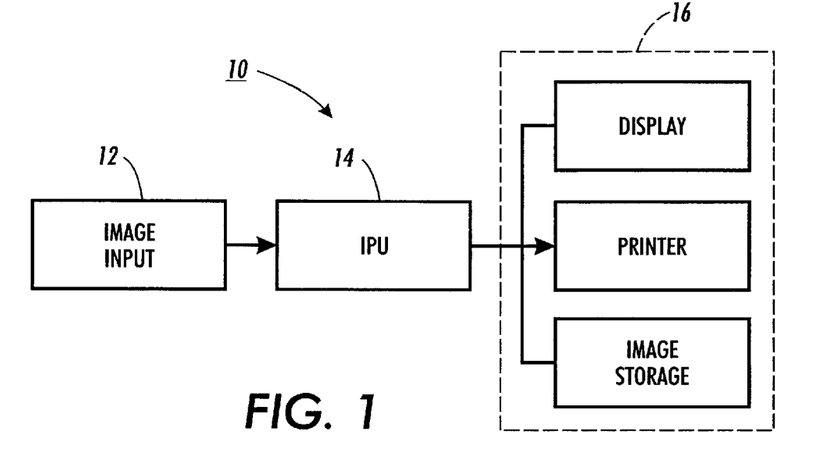
FIG. 1 is a diagrammatic illustration of a digital image processing system formed in accordance with the present invention.

Referring now to the drawings wherein the showings are for purposes of describing preferred embodiments of the invention only and not for purposes of limiting same, a digital image processing system 10 formed in accordance with the present invention is shown in FIG. 1. An image input unit 12, such as a scanner, image storage device, and/or computer image generator derives/delivers digital image data in the form of one or more monochromatic separations, wherein the picture elements or pixels of each separation are defined at a depth of "d" bits per pixel where "d" is an integer. Accordingly, each pixel of each separation is defined in terms of "d" bits per pixel (bit depth=d), and each pixel has some gray value between full "off" and full "on." When the digital image data is provided in terms of a single monochromatic separation, the image is monochromatic, for example, so called black-and-white image data. On the other hand, when the digital image data is provided in terms of two or more monochromatic separations, a color image results when the data from the separations is combined, for example, red-green-blue (RGB) separations or cyan-magenta-yellow (CMY) separations. Color digital image data supplied by the image input unit 12 can alternatively be supplied in the form of a luminance-chrominance color space, such as CIELAB or the like, as is well known in the art, and conversion among various color spaces is also contemplated herein.

The digital image signals are input from the scanner 12 to an image processing unit 14 wherein digital image processing, such as edge enhancement with luminance channel overshoot control in accordance with the present invention, is performed. The image processing unit 14 may be provided by any suitable electronic computing apparatus such as a programmed general purpose computer, a dedicated electronic circuit, or any other suitable electronic circuit means. The image processing unit 14 outputs processed digital image data in a suitable format to an image output terminal 16, such as a storage device, a digital printer, and/or a visual display. Suitable apparatus for digital image input and/or output include the XEROX Document Center 265DC digital imaging system, Pixelcraft 7650 Pro Imager Scanner, XEROX DocuTech Production Printing System scanners, the XEROX 5775 digital color copier, the XEROX 5760 and 5765 Majestik digital color copiers, or any other suitable color digital scanner/copier. Regardless of the depth "d" at which each pixel is defined, the location of each pixel in each separation bitmap is also defined, typically in terms of a row "n" and a column "m."

Figure 2:
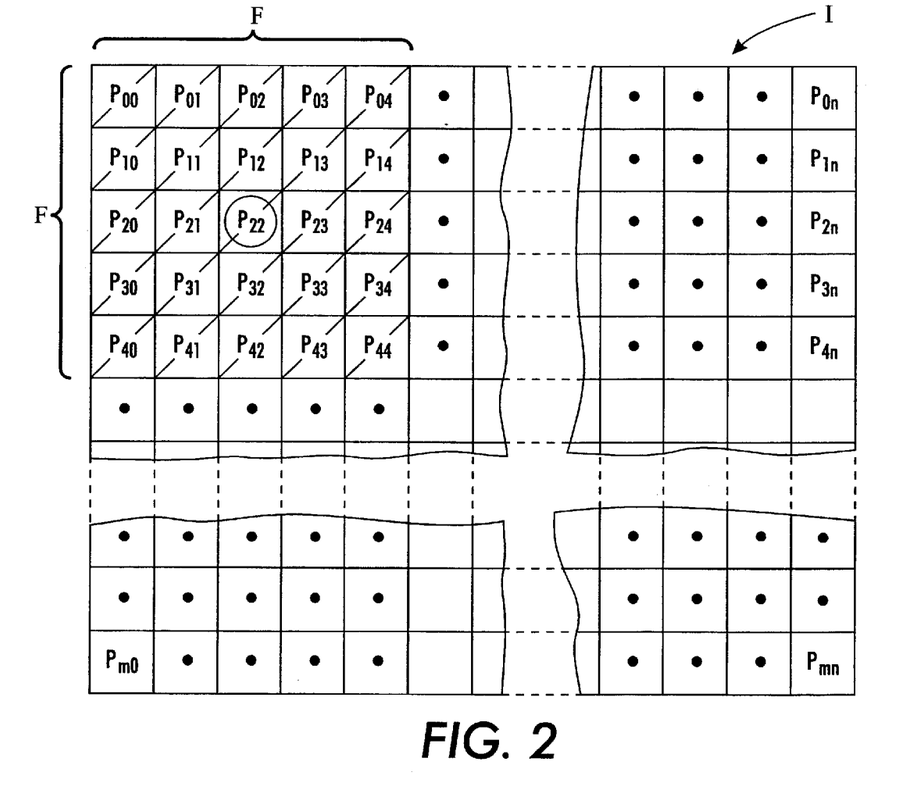
FIG. 2 is an illustration of a digital image wherein a portion of the digital image is subject to edge enhancement filtering.

FIG. 2 illustrates a color digital image I as derived by the image input terminal 12. As described above, the image I comprises a plurality of pixels P arranged in m rows and n columns so that each pixel P is uniquely identifiable by a row/column designation mn, e.g., $P_{22}$ which represents the pixel P located in the third row and third column. As noted, each pixel P of a color digital image I is defined by several monochromatic gray values or in terms of its luminance and chrominance values depending upon the color space.

For convenience and ease of understanding the present invention, the invention will be described in terms of the pixels P being defined in the CIELAB color space. As is generally known in the art, CIELAB is a perceptual color space wherein color is represented in three dimensions according to a lightness value (represented on the L* axis), a redness-greenness value (represented on the a* axis), and a yellowness-blueness value (represented on the b* axis). Thus, the a* and b* chrominance values define first and second chrominance channels for the CIELAB color space. However, those of ordinary skill in the art will certainly recognize that the invention can be carried out in any luminance-chrominance color space and that any other color space, such as RGB, CMYK, or the like is freely convertible into CIELAB or another luminance-chrominance color space. It is not intended that the invention be limited to any particular color space.

With continuing reference to FIG. 2, the cross-hatched area F represents a spatial filter as is also well known in the art of digital image processing. In particular, the 12 represented filter F is a finite impulse response (FIR) filter that alters the value of a centrally located subject pixel P based upon the original values of all other neighborhood pixels P, i.e., all other pixels P encompassed by the filter F at a given time. The contribution of each neighborhood pixel to the final value of the subject pixel P varies depending upon the weight assigned to that neighborhood pixel according to the particular filtering operation being performed.

As illustrated in FIG. 2, by way of example only, the filter F is an FIR edge enhancement filter of a size that is 5 pixels by 5 pixels (5×5). The central pixel $P_{22}$ is the subject pixel, and the remaining pixels P encompassed by the filter are the neighborhood pixels that will be used to alter the value of the subject pixel $P_{22}$ for purposes of edge or other enhancement. As is well known, the filter F is applied to each pixel P in the image I for image enhancement operations. The FIR filtering operation, itself, is conventional and does not form a part of the present invention. Thus, any other size/type of FIR or other edge enhancement filter may be used without departing from the overall scope and intent of the present invention.

Figure 3:
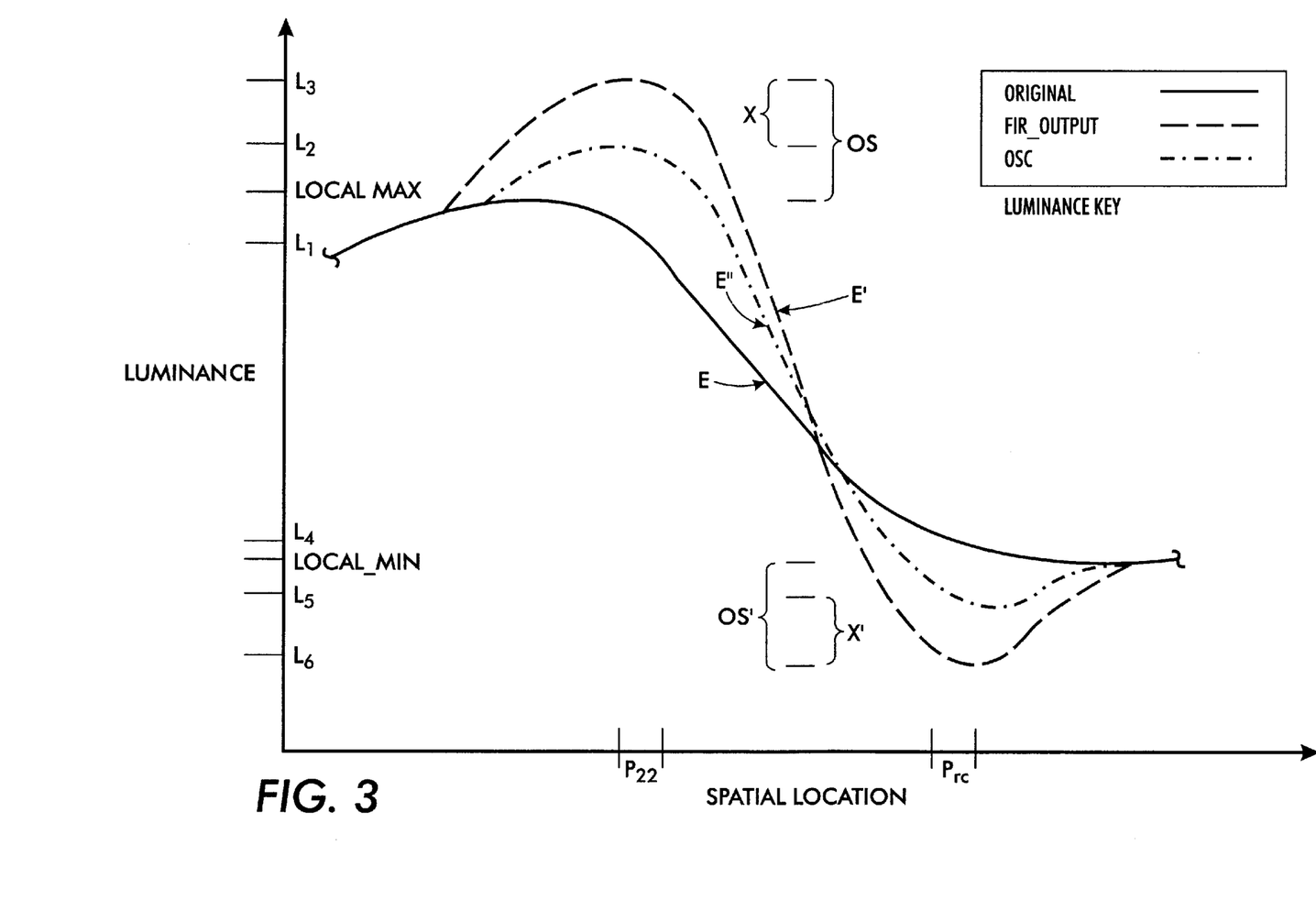
FIG. 3 graphically illustrates luminance channel overshoot and control of same in accordance with the present invention.

FIG. 3 graphically illustrates luminance channel overshoot in response to FIR or other enhancement filtering and control of same in accordance with the present invention. The solid line represents luminance values of the unfiltered image data I for each pixel P, e.g., in the CIELAB color space, the solid line represents the L* luminance channel. It can be seen that, in an edge region E of the image I, the luminance values change from a higher level to a lower level. However, this, change in luminance values is gradual and the edge region E of the image I is, thus, not well defined or "sharp." To make the image I more visually appealing, FIR filtering is carried out on the original image I to enhance the edge region E and other edge regions.

As is graphically illustrated with a broken line FIR__OUTPUT, after FIR filtering, the transition from a higher luminance to a lower luminance in the edge region of the image I is much steeper indicating a much sharper, enhanced edge region E'. However, with reference to the pixel $P_{22}$ as an example, its luminance value has been raised from an original value $L_1$ to an FIR__OUTPUT value of $L_3$ Further, the FIR__OUTPUT luminance value of the pixel $P_{22}$ exceeds a local maximum original luminance value LOCAL__MAX of pixels P in a neighborhood about the pixel $P_{22}$ by a positive overshoot amount OS. The neighborhood of original luminance values about the pixel $P_{22}$ used to identify LOCAL__MAX preferably corresponds to. the neighborhood of the filter F, or a subset of same, but may be any other neighborhood in the region of the subject pixel, in this case the pixel $P_{22}$. Accordingly, the luminance of the pixel $P_{22}$ has been altered significantly relative to surrounding pixels, and the appearance of the output image may be undesirably altered due to color shift or "fringing" of the pixel $P_{22}$.

Similarly, with reference to the pixel $P_{rc}$, the FIR filtering operation has caused its luminance value to be reduced from a luminance value $L_4$ (solid line) to an FIR__OUTPUT value $L_6$ (broken line). Also, the FIR__OUTPUT luminance value is less than a local minimum luminance value LOCAL__MIN of original image pixels P in the neighborhood of the pixel $P_{rc}$ by a negative overshoot amount OS'. Again, the neighborhood used to locate the local minimum luminance value LOCAL__MIN preferably corresponds to the neighborhood of the FIR filter, itself, or a subset thereof, but may be any other neighborhood in the region of the subject pixel, in this case the pixel $P_{rc}$. Thus, the luminance value of the pixel $P_{rc}$ has also been altered in a manner that will sharpen the edge E but may cause undesired color shift relative to the appearance of the original image I.

With continuing reference to FIG. 3, it is shown that luminance channel overshoot control in accordance with the present invention attenuates luminance channel overshoot OS,OS'. The phantom overshoot control line OSC represents the pixel luminance values P for the same edge region at E" after performance of luminance channel overshoot control in accordance with the present invention. It is shown that, the positive overshoot OS associated with of the pixel $P_{22}$ is reduced by an amount X=OS*f, wherein, f is a programmable overshoot reduction coefficient discussed in full detail below. Likewise, the negative overshoot OS' of the pixel $P_{rc}$ is attenuated via luminance channel overshoot control in accordance with the present invention by an amount X'=OS'*f. However, it is significant to note that the phantom line OSC representing the same edge region at E" after overshoot control in accordance with the present invention is nearly as steep as the broken line FIR_OUTPUT representing the edge region E' after FIR edge enhancement. Thus, it can be seen that overshoot control in accordance with the present invention attenuates luminance overshoot without significantly compromising edge enhancement or sharpness.

In general, luminance channel overshoot control in accordance with the present invention to obtain a final output luminance value OSC for each pixel P based upon an input luminance value FIR_OUTPUT provided after FIR or other edge enhancement operations can be described mathematically by the following:

OS=FIR_OUTPUT−LOCAL_MAX
OS'=LOCAL_MIN−FIR_OUTPUT
OSC=FIR_OUTPUT−f*OS
  if FIR_OUTPUT>LOCAL_MAX;
OSC=FIR_OUTPUT+f*OS'
  if FIR_OUTPUT<LOCAL_MIN; and,
OSC=FIR_OUTPUT
  if LOCAL_MIN<=FIR_OUTPUT<=LOCAL_MAX, again, wherein f is programmable luminance overshoot reduction coefficient as noted above. Thus, the amount of luminance overshoot control varies depending upon the value of the coefficient f. For example, if f=0.25, the overshoot OS,OS' will be attenuated by 25%. Thus, the effects of the FIR enhancement operation are decreased by 25% to prevent undesired color fringing.

Figure 4:
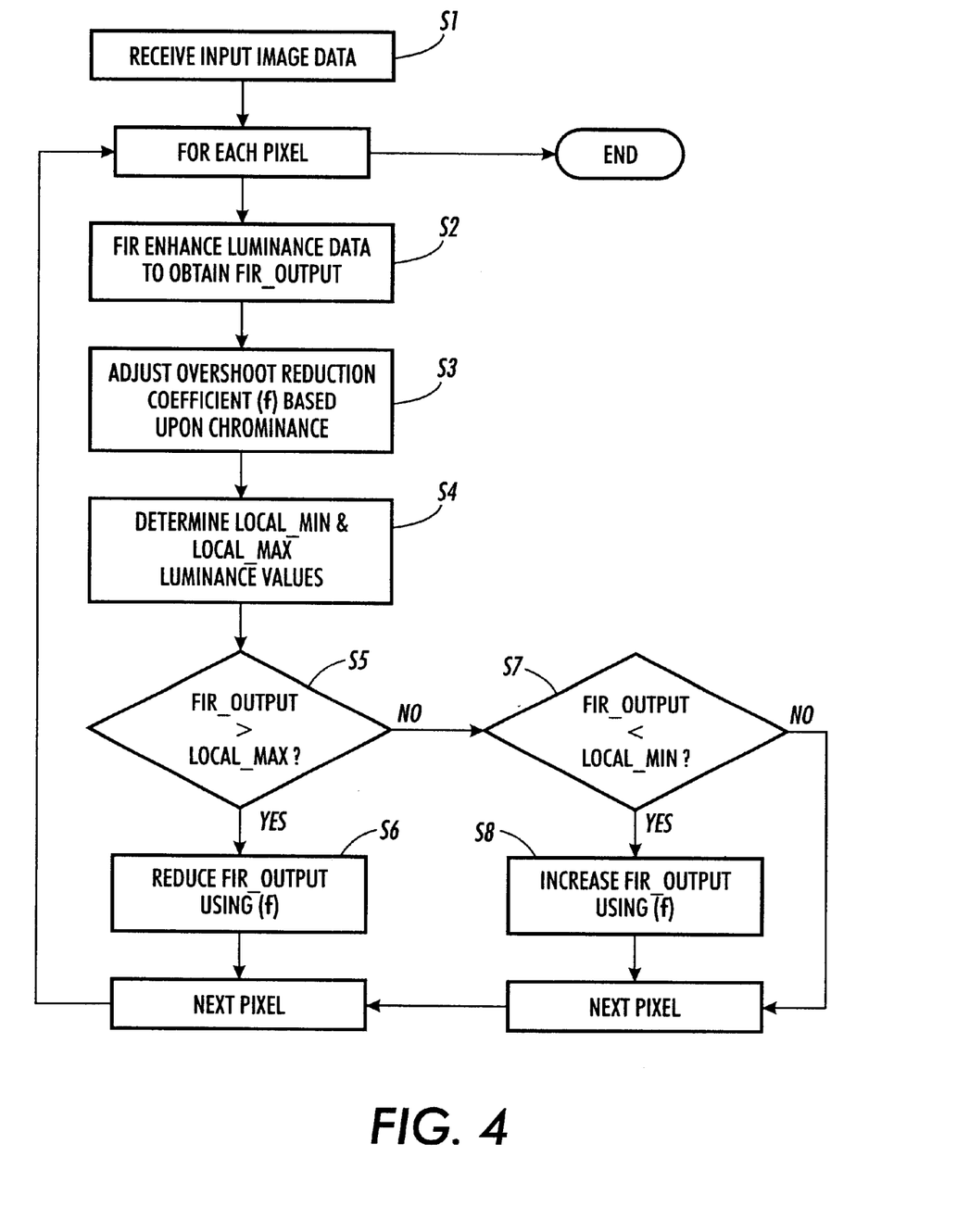
FIG. 4 is a flow chart that illustrates edge enhancement with luminance channel overshoot control in accordance with the present invention.

Referring now to FIG. 4, luminance channel overshoot control in accordance with the present invention is described. A step or means S1 receives the digital image data of an original image I. For each pixel P of the original image, a step or means S2 enhances the luminance channel image data defining the pixel P using FIR or other edge enhancement filtering. Those of ordinary skill in the art will recognize that the chrominance information defining the pixels P of the original image I could also be enhanced, but such does not necessarily form a part of the present invention. A suitable method and apparatus for chrominance channel enhancement with overshoot control is described in co-pending and commonly owned U.S. application Ser. No. 09/393,534, entitled "CHROMINANCE CHANNEL OVERSHOOT CONTROL IN IMAGE ENHANCEMENT" filed Sep. 10, 1999 (via U.S. Express Mail No. EM414702234US); Attorney Docket No. XER 2 0256) which is hereby expressly incorporated by reference herein.

A step or means S3 adjusts the overshoot reduction coefficient f based upon the chrominance of the particular pixel P under consideration. In general, as is described below, luminance channel overshoot is more objectionable when it is associated with more colorful pixels P having high chroma values. In contrast, luminance channel overshoot associated with less colorful pixels, such as neutral or black-and-white pixels, is less objectionable (or even desirable). Thus, in general, the step or means S3 examines the original (non-enhanced) chroma value of the pixel P being processed, and adjusts the overshoot reduction coefficient f accordingly so that pixels P with higher chroma values are subject to greater luminance channel overshoot attenuation than pixels with lower chroma values.

For each pixel P of the original image, a step or means S4 determines the original (non-enhanced) LOCAL_MIN and LOCAL_MAX luminance values of pixels in a neighborhood about the subject enhanced pixel P. As is described above, these values LOCAL_MIN,LOCAL_MAX are used to determine the existence of overshoot OS,OS', and whether the overshoot, if any, is "positive" (above LOCAL_MAX) or "negative" (below LOCAL_MIN).

A step or means S5 determines if the luminance of the enhanced pixel FIR_OUTPUT is greater than LOCAL_MAX and, if so, a step or means S6 reduces the luminance FIR_OUTPUT of the enhanced pixel P as described above according to the overshoot reduction coefficient f. On the other hand, if the luminance FIR_OUTPUT of the enhanced pixel P is less than LOCAL_MAX, a step or means S7 determines if the luminance of the enhanced pixel P is less than LOCAL_MIN and, if so, a step or means S8 increases the luminance FIR_OUTOUT of the enhanced pixel P as described above according to the overshoot reduction coefficient f.

Figure 5:
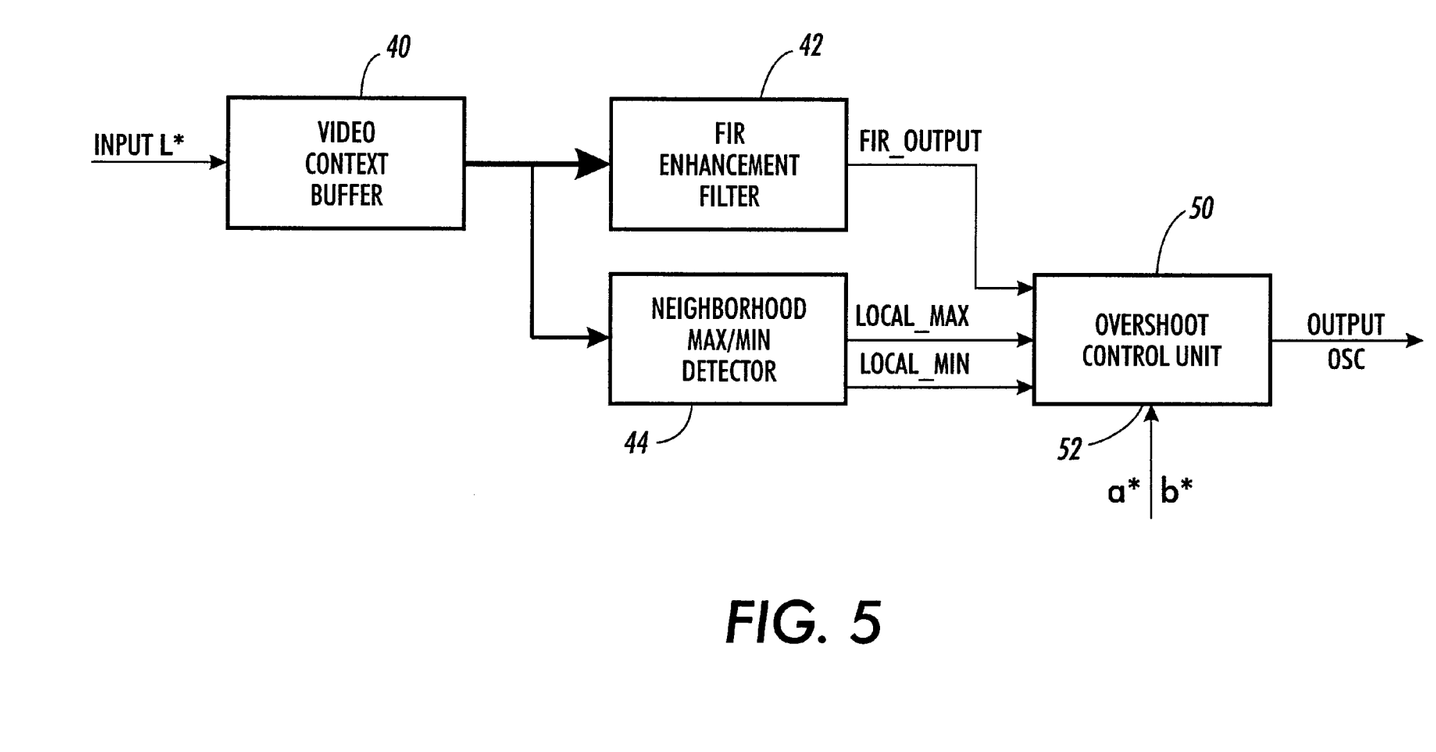
FIG. 5 is a block diagram illustrating a luminance channel overshoot apparatus formed in accordance with the present invention.
Figure 6:
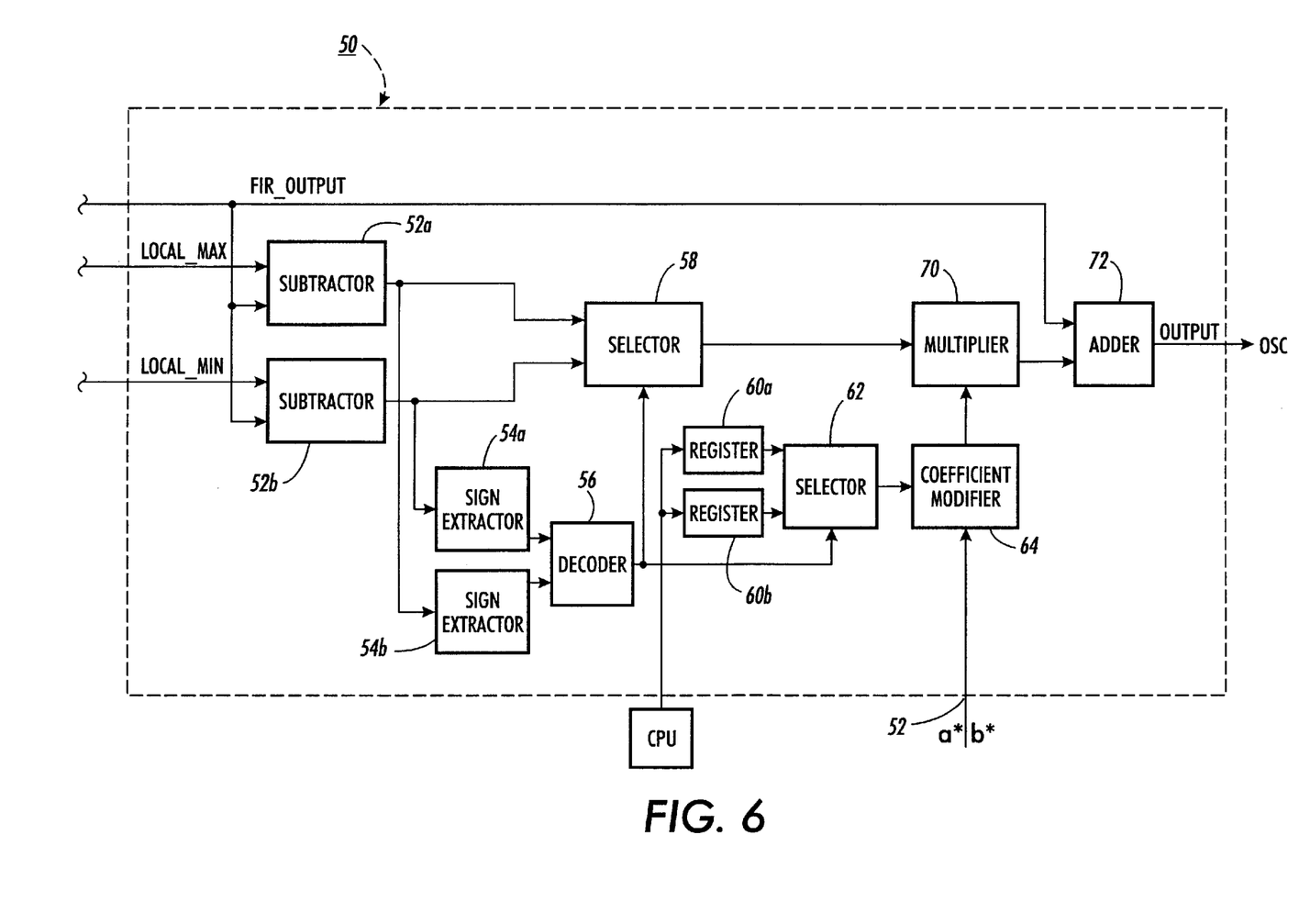
FIG. 6 is a block diagram illustrating the overshoot control unit of the apparatus shown in FIG. 5 as used for controlling luminance channel overshoot in accordance with the present invention.
Figure 7:
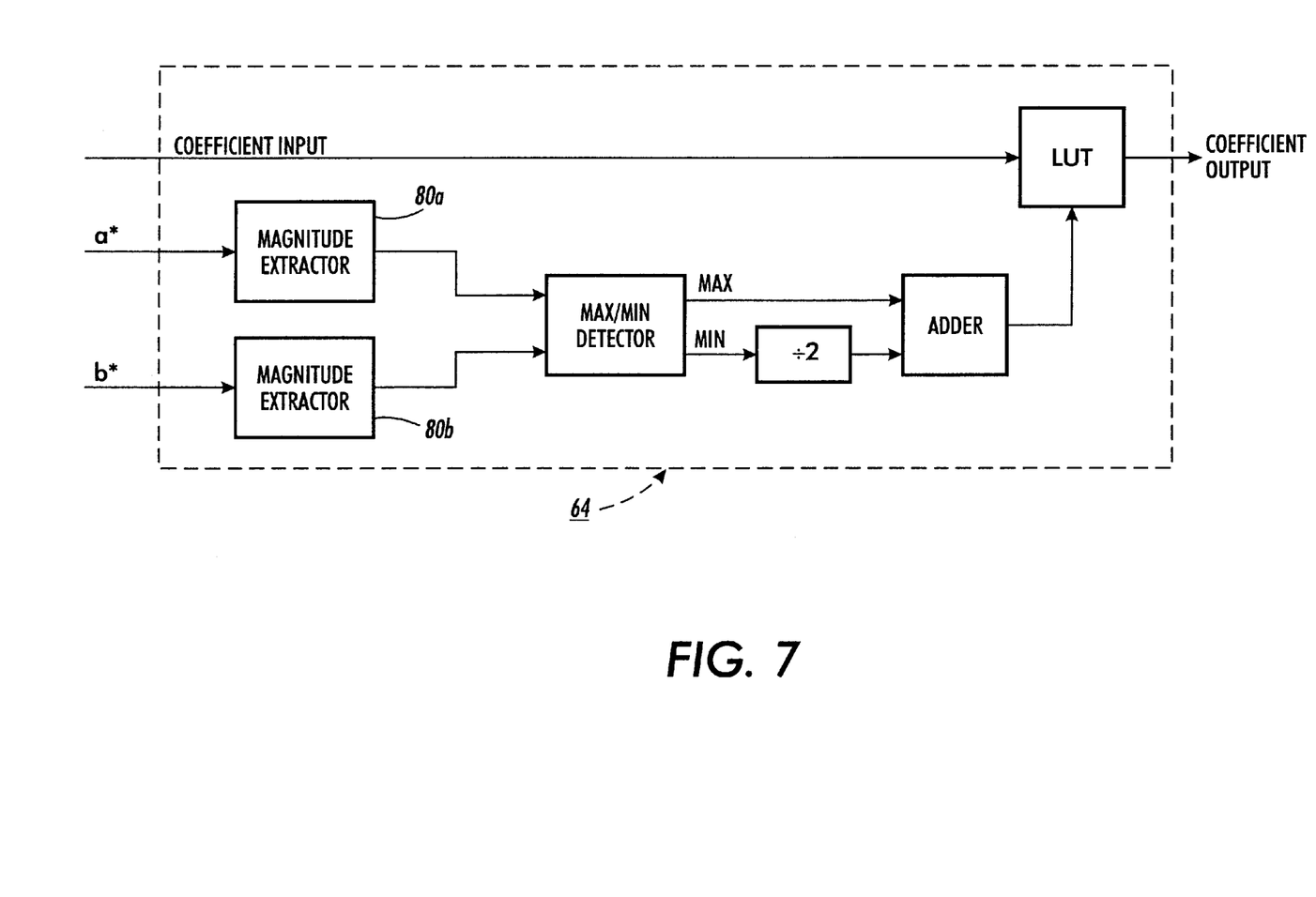
FIG. 7 is a block diagram of an apparatus adapted for adjusting a luminance overshoot reduction parameter based upon the chroma of the pixel being processed in accordance with the present invention; and, FIG. 8 is a flow chart illustrating adjustment of a luminance overshoot reduction parameter based upon the chroma of the pixel being processed in accordance with the present invention.

FIGS. 5–7 diagrammatically illustrate one example of an apparatus specifically adapted for performing edge enhancement with luminance channel overshoot control in accordance with the present invention. As noted above, those of ordinary skill in the art will recognize that the apparatus illustrated in FIGS. 5–7 is preferably the image processing unit 14, programmed or otherwise configured to provide structure and/or operations necessary for the subject invention.

Luminance input values, such as CIELAB L* values, are input to a buffer 40. As noted above, the chrominance values, such as CIELAB a* and b* values, could be enhanced in a different operation. An FIR edge enhancement filter 42 performs the edge enhancement step S2 on the luminance L* values, and a neighborhood min/max detector 44 determines the luminance values for LOCAL_MIN and LOCAL_MAX to perform the operation S4. These values LOCAL_MIN,LOCAL_MAX are input from the detector 44 to an overshoot control unit 50, and the overshoot control unit 50 also includes one or more inputs 52 that receive the chrominance values, such as a* and b* values, for the pixel P being processed. Thus, the overshoot control unit 50 performs luminance channel overshoot control in accordance with the present invention, in particular, steps S3, and S5–S8, as appropriate, and supplies the resulting luminance value OSC for each pixel P that is processed as output.

With particular reference to FIG. 6, the illustrated example of an overshoot control unit 50 includes subtractors 52a,52b, sign extractors 5a,54b, a decoder 56, and a first selector 58 that perform the operations S4,S5,S7 as appropriate to determine if the luminance value FIR_OUTPUT for an enhanced pixel P is greater than LOCAL_MAX, less than LOCAL_MIN, or between these values. One or more initial values for the overshoot reduction coefficient f are preferably preprogrammed and stored in registers 60a,60b, and a central processing unit CPU of the image processing unit 14, together with a second selector 62, causes one of the stored coefficients to be input to a coefficient modifier 64. The coefficient modifier 64 performs the operation S3 to adjust the overshoot reduction coefficient f based upon the chrominance of the pixel P being processed. In particular, the coefficient modifier 64 receives an initial overshoot reduction coefficient value f and also the chrominance value(s) (such as a* and b* in the CIELAB color space) of the pixel P being processed. Based upon the input chrominance values, the coefficient modifier 64 assesses the chrominance of the pixel P being processed and adjusts the overshoot reduction coefficient f based upon same to calculate a modified overshoot reduction coefficient f.

The first selector 58, as controlled by output from the decoder 56, sends one of the overshoot values OS,OS' from the subtractors 52a,52b to a multiplier 70. The multiplier 70 also receives as input the modified overshoot reduction coefficient f from the coefficient modifier 64, and performs the above-described multiplication of the adjusted overshoot reduction coefficient f with the overshoot values OS,OS'. An adder 72 sums the result supplied by the multiplier 70 with the enhanced luminance value FIR_OUTPUT for the pixel P being processed to complete the overshoot control operations S6,S8 and obtain the output luminance value OSC.

As noted above, the overshoot control unit 50 preferably includes registers or other means 60a,60b for storing at least two different pre-programmed initial overshoot reduction coefficient values f. The second selector 62 is programmed to select one of these stored coefficient values depending upon whether the overshoot is "positive" (FIR_OUTPUT>LOCAL_MAX) or "negative" (FIR_OUTPUT<LOCAL_MIN). This allows for the overshoot OS,OS' to be controlled differently in each case. For example, it may be desirable to use an initial value f=0.50 for negative overshoot control and an initial value f=0.75 for positive overshoot control. This, then, provides for greater flexibility in overshoot control as desired for a particular application.

Figure 8:
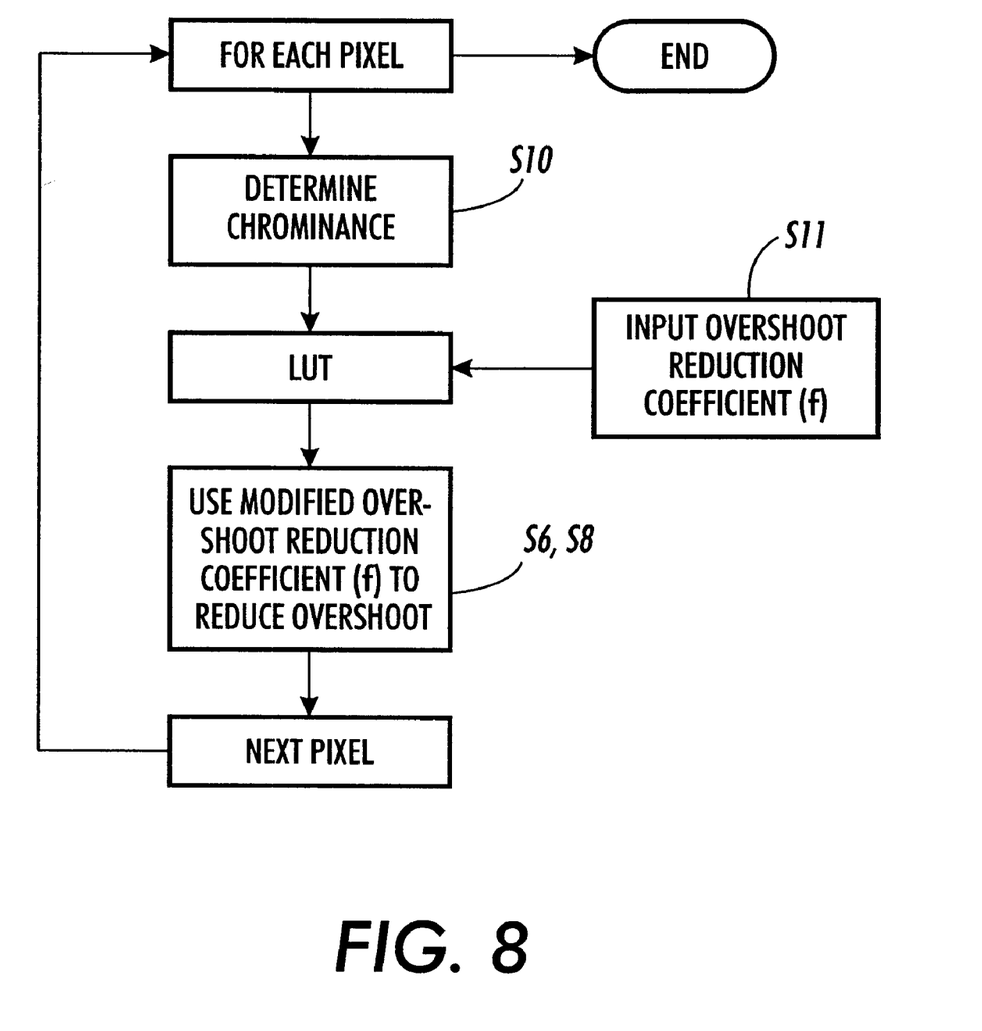

FIG. 7 is a block diagram illustrating an example of an overshoot reduction coefficient modifier apparatus 64 formed in accordance with the present invention, and FIG. 8 is a flow-chart corresponding thereto illustrating adjustment of the overshoot reduction coefficient f for each pixel P being processed based upon the chrominance of the pixel. With particular reference initially to FIG. 8, for each pixel P, a step or means S10 determines the chrominance of the pixel. The chrominance determined need not be an exact value, but can be an approximation or simply one or a plurality of discrete chrominance levels. This chrominance value or level is input to a look-up table LUT along with the input overshoot reduction coefficient f by the step or means S11. The output from the look-up table LUT is the modified overshoot reduction coefficient f. This, then, is used by the steps/means S6,S8 as previously described to reduce luminance overshoot in accordance with the present invention.

The apparatus illustrated in FIG. 7 implements the following equation that provides a method of approximating chrominance of a pixel P defined in terms of the CIELAB color space:

Chrominance=max(|a*|,|b*|)+min(|a*|,|b*|)/2

This, of course, is an approximation of chrominance, and those of ordinary skill in the art will recognize that chrominance may be determined or approximated by other methods, and it is intended that the present invention be construed as encompassing all of same.

As shown in FIG. 7, to implement the foregoing, chrominance values, such as a* and b* values in the present example, are input to magnitude extractors 80a,80b, respectively, the min/max detector 82, the division unit 84 and, finally, the look-up table LUT whereby the modified overshoot reduction coefficient is derived for use as noted above.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, what is claimed is:

1. A method of digital image processing comprising:

receiving input digital image data defining a plurality of pixels of an input color digital image, said input digital image data including at least a luminance value and a chrominance value for each of said pixels of said input image;

for each of said pixels of said input digital image, enhancing said input digital image data defining said pixel based upon the input digital image data defining neighborhood pixels in a spatial neighborhood established about said pixel to obtain enhanced digital image data defining said pixel, said enhanced digital image data including at least an enhanced luminance value;

for each of said pixels of said input digital image, performing an overshoot control operation on said enhanced digital image data defining said pixel, said overshoot control operation comprising:

determining local maximum and local minimum input luminance values in a spatial neighborhood about the pixel;

comparing the enhanced luminance value of said pixel to said local maximum and local minimum luminance values to determine if said enhanced pixel luminance value is one of: (i) above the local maximum luminance value by a positive overshoot amount; and, (ii) below the local minimum luminance value by a negative overshoot amount;

receiving an input overshoot reduction coefficient;

evaluating the chrominance of the pixel;

using the chrominance of the pixel to adjust the input overshoot reduction coefficient so as to obtain a modified overshoot reduction coefficient;

if said enhanced luminance value of said pixel is above said local maximum luminance value, reducing said enhanced luminance value to attenuate said positive overshoot amount by a quantity that depends upon said modified overshoot reduction coefficient; and, if said enhanced luminance value of said pixel is below said local minimum luminance value, increasing said enhanced luminance value to attenuate said negative overshoot amount by a quantity that depends upon said modified overshoot reduction coefficient.

2. The digital image processing method as set forth in claim 1, wherein said step of enhancing said digital image data of said input digital image comprises applying a finite impulse response (FIR) filter to said digital image data defining each pixel of said input digital image to sharpen edge regions of said input digital image.

3. The digital image processing method as set forth in claim 1, wherein said digital image data defining each of said pixels of said input digital image is defined in a CIELAB color space in terms of a luminance value L* and first and second chrominance values a*,b*.

4. The digital image processing method as set forth in claim 3, wherein said step of evaluating the chrominance of the pixel comprises deriving a chroma value C that defines the chrominance of the pixel according to:

C=max(|a*|,|b*|)+min(|a*|,|b*|)/2.

5. The digital image processing method as set forth in claim 1, wherein said step of receiving an input overshoot reduction coefficient comprises:

receiving a first input overshoot reduction coefficient if said overshoot amount is a positive overshoot amount; and, receiving a second input overshoot reduction coefficient, different from said first input overshoot coefficient, if said overshoot amount is a negative overshoot amount.

6. The digital image processing method as set forth in claim 1, wherein said step of reducing said enhanced luminance value to attenuate said positive overshoot amount comprises:

multiplying said positive overshoot amount by said modified overshoot reduction coefficient to obtain a positive overshoot attenuation amount; and, subtracting said positive overshoot attenuation amount from said enhanced luminance value.

7. The digital image processing method as set forth in claim 1, wherein said step of increasing said enhanced luminance value to attenuate said negative overshoot amount comprises:

multiplying said negative overshoot amount by said modified overshoot reduction coefficient to obtain a negative overshoot attenuation amount; and, adding said negative overshoot attenuation amount to said enhanced luminance value.

8. A method of enhancing a color digital image comprising, for each of a plurality of pixels defining said color digital image:

modifying a luminance value of a subject pixel in response to an enhancement filtering operation to obtain a modified luminance value for the subject pixel;

within a neighborhood of pixels spatially near the subject pixel, identifying a local minimum pixel luminance value and a local maximum pixel luminance value;

determining the chroma of the subject pixel;

receiving an overshoot reduction coefficient;

modifying said overshoot reduction coefficient based upon said chroma of the subject pixel to obtain a modified overshoot reduction coefficient;

comparing the modified luminance value to at least one of the local minimum and local maximum luminance values;

if said modified luminance value is greater than said local maximum luminance value, using said modified overshoot reduction coefficient to reduce said modified luminance value of said subject pixel by a percentage of the amount by which said modified luminance value exceeds said local maximum luminance value; and, if said modified luminance value is less than said local minimum luminance value, using said modified overshot reduction coefficient to increase said modified luminance value of said subject pixel by a percentage of the amount by which said modified luminance value is less than said local minimum luminance value.

9. The method of enhancing a digital color image as set forth in claim 8, wherein said enhancement filtering operation comprises a finite impulse response (FIR) filtering operation.

10. The method of enhancing a digital color image as set forth in claim 8, wherein the plurality of pixels of the digital image are each defined in terms of a luminance value and first and second chrominance values.

11. A digital image processing apparatus comprising:

means for receiving input digital image data defining a plurality of pixels of an input color digital image, said input digital image data including at least a luminance value and a chrominance value for each of said pixels of said input image;

means adapted for enhancing each of said pixels of said input digital image based upon the input digital image data defining neighborhood pixels in a spatial neighborhood established about each of said pixels to obtain enhanced digital image data defining each of said enhanced pixels, said enhanced digital image data including at least an enhanced luminance value;

means adapted for performing an overshoot control operation on said enhanced digital image data defining each enhanced pixel, said means adapted for performing an overshoot control operation comprising:

means for determining local maximum and local minimum input luminance values in a spatial neighborhood about each enhanced pixel;

means for comparing the enhanced luminance value of each enhanced pixel to said local maximum and local minimum luminance values to determine if said enhanced pixel luminance value is one of: (i) above the local maximum luminance value by a positive overshoot amount; and, (ii) below the local minimum luminance value by a negative overshoot amount;

means for receiving an input overshoot reduction coefficient;

means for evaluating the chrominance of the enhanced pixel as defined by said chrominance value;

means for using the chrominance of the enhanced pixel to adjust the input overshoot reduction coefficient so as to obtain a modified overshoot reduction coefficient;

means for reducing said enhanced luminance value to attenuate said positive overshoot amount by a quantity that depends upon said modified overshoot reduction coefficient if said enhanced luminance value of said pixel is above said local maximum luminance value; and, means for increasing said enhanced luminance value to attenuate said negative overshoot amount by a quantity that depends upon said modified overshoot reduction coefficient if said enhanced luminance value of said pixel is below said local minimum luminance value.

12. The digital image processing apparatus as set forth in claim 11, wherein said means for enhancing said digital image data of said input digital image comprises means for applying a finite impulse response (FIR) filter to said digital image data defining each pixel of said input digital image to sharpen edge regions of said input digital image.

13. The digital image processing apparatus as set forth in claim 11, wherein said digital image data defining each of said pixels of said input digital image is defined in a CIELAB color space in terms of a luminance value L* and first and second chrominance values a*,b*.

14. The digital image processing apparatus as set forth in claim 11, wherein said means for receiving an input overshoot reduction coefficient comprises:

means for receiving a first input overshoot reduction coefficient if said overshoot amount is a positive overshoot amount; and, means for receiving a second input overshoot reduction coefficient, different from said first input overshoot coefficient, if said overshoot amount is a negative overshoot amount.

15. A method of processing a digital image, said method comprising:

enhancing a luminance value (L*) of each of a plurality of input pixels (P) to obtain an enhanced luminance value (FIR_OUTPUT) for each pixel;

identifying positive overshoot associated with a subject pixel of said digital image if the enhanced luminance value (FIR_OUTPUT) of the subject pixel is greater than a local maximum luminance value (LOCAL_MAX) of input pixels (P) in a spatial neighborhood of the subject pixel in said digital image by a positive overshoot amount (OS);

identifying negative overshoot associated with a subject pixel of said digital image if the enhanced luminance value (FIR_OUTPUT) of the subject pixel is less than a local minimum luminance value (LOCAL_MIN) of input pixels (P) in a spatial neighborhood of the subject pixel in said digital image by a negative overshoot amount (OS');

providing an overshoot reduction coefficient (f) that controls the amount by which positive or negative overshoot associated with the subject pixel is attenuated;

adjusting said overshoot reduction coefficient (f) according to a chrominance of the subject pixel so that said overshoot reduction coefficient (f) is adjusted to have increasing overshoot attenuation effect as said chrominance of said subject pixel increases; and, using said overshoot reduction coefficient (f), as adjusted based upon the chrominance of the subject pixel, to attenuate one of said positive and negative overshoot associated with the subject pixel.

16. The digital image processing method as set forth in claim 15, wherein said overshoot reduction coefficient is used to attenuate positive overshoot according to:

FIR_OUTPUT−f*OS and used to attenuate negative overshoot according to:

FIR_OUTPUT+f*OS'.

17. The digital image processing method as set forth in claim 16, wherein said plurality of input pixels are defined in terms of a luminance value and first and second chrominance values.

18. The digital image processing method as set forth in claim 17, wherein said plurality of input pixels are defined in a CIELAB color space by:

said luminance value=L*;

said first chrominance value=a*; and, said second chrominance value=b*, wherein said chrominance used to adjust said overshoot reduction coefficient is defined by:

$\max(|a^*|,|b^*|)+\min(|a^*|,|b^*|)/2$.

19. The digital image processing method as set forth in claim 15 further comprising:

providing first and second different overshoot reduction coefficients;

if positive overshoot is associated with said subject pixel, adjusting said first overshoot reduction coefficient according to the chrominance of subject pixel so that said overshoot reduction coefficient is adjusted to have increasing overshoot attenuation effect as said chrominance of said subject pixel increases;

if negative overshoot is associated with said subject pixel, adjusting said second overshoot reduction coefficient according to the chrominance of subject pixel so that said overshoot reduction coefficient is adjusted to have increasing overshoot attenuation effect as said chrominance of said subject pixel increases;

using said first and second overshoot reduction coefficients to attenuate said positive and negative overshoot amounts associated with the subject pixel, respectively.

* * * * *